(12) United States Patent
Fukuda et al.

(10) Patent No.: US 11,292,076 B2
(45) Date of Patent: Apr. 5, 2022

(54) FRICTION SPOT JOINING DEVICE AND FRICTION SPOT JOINING METHOD

(71) Applicant: KAWASAKI JUKOGYO KABUSHIKI KAISHA, Kobe (JP)

(72) Inventors: Takuya Fukuda, Kakogawa (JP); Ryoji Ohashi, Kobe (JP); Masahiro Miyake, Kobe (JP); Yoshitaka Muramatsu, Akashi (JP); Hajime Kashiki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 335 days.

(21) Appl. No.: 15/778,854

(22) PCT Filed: Nov. 15, 2016

(86) PCT No.: PCT/JP2016/004887
§ 371 (c)(1),
(2) Date: May 24, 2018

(87) PCT Pub. No.: WO2017/090239
PCT Pub. Date: Jun. 1, 2017

(65) Prior Publication Data
US 2018/0354064 A1    Dec. 13, 2018

(30) Foreign Application Priority Data

Nov. 24, 2015    (JP) .............................. JP2015-228691

(51) Int. Cl.
*B23K 20/12*    (2006.01)

(52) U.S. Cl.
CPC .......... *B23K 20/1265* (2013.01); *B23K 20/12* (2013.01); *B23K 20/123* (2013.01);
(Continued)

(58) Field of Classification Search
CPC ........................................... B23K 20/122–128
See application file for complete search history.

(56) References Cited

U.S. PATENT DOCUMENTS

| | | | | |
|---|---|---|---|---|
| 6,050,475 A | * | 4/2000 | Kinton | B23K 20/121 144/142 |
| 6,236,017 B1 | * | 5/2001 | Smartt | B23K 9/093 219/130.01 |

(Continued)

FOREIGN PATENT DOCUMENTS

| | | | | |
|---|---|---|---|---|
| JP | 2000301361 A | * | 10/2000 | ......... B23K 20/1235 |
| JP | 3471338 B2 | | 12/2003 | |
| JP | 2011-25317 A | | 2/2011 | |

OTHER PUBLICATIONS

Djurdjevic et al., "Heat Input Effect of Friction Stir Welding On Aluminium Alloy AA 6061-T6 Welded Joint", Thermal Science; Belgrade vol. 20, Iss. 2, (2016): 637-641. DOI:10.2298/TSCI150814147D (Year: 2016).*

*Primary Examiner* — Erin B Saad
*Assistant Examiner* — Carlos J Gamino
(74) *Attorney, Agent, or Firm* — Oliff PLC

(57) ABSTRACT

A friction spot joining device configured to carry out friction spot joining of a pair of plates includes an advance-retreat drive configured to advance and retreat a tool to/from the plates a rotation drive configured to rotate the tool, and a controller configured to control the advance-retreat drive and the rotation drive. The controller executes a joining control in which the tool is caused to give pressure to the plates while the tool is rotated so that the tool is pushed into the plates, and a separating control in which the tool is separated from the plates when an integrated value ($P = I_D \times \Delta T$) calculated using a current value ($I_D$) of the rotation drive (Continued)

during the joining control and a driving period of time (ΔT) during the joining control is determined to be reached a target value.

4 Claims, 10 Drawing Sheets

(52) U.S. Cl.
CPC .......... *B23K 20/125* (2013.01); *B23K 20/126* (2013.01); *B23K 20/1255* (2013.01)

(56) References Cited

U.S. PATENT DOCUMENTS

| | | | | |
|---|---|---|---|---|
| 7,032,801 | B2* | 4/2006 | Raether | B23K 20/1235 228/2.1 |
| 8,556,156 | B1* | 10/2013 | Bharadwaj | B23K 20/1255 228/102 |
| 8,657,179 | B1* | 2/2014 | Ding | B23K 20/26 228/2.1 |
| 2002/0050508 | A1* | 5/2002 | Yoshinaga | B23Q 1/012 228/112.1 |
| 2003/0029903 | A1* | 2/2003 | Kashiki | B23K 20/123 228/112.1 |
| 2003/0141343 | A1* | 7/2003 | Murakami | B23K 20/1265 228/112.1 |
| 2004/0112939 | A1* | 6/2004 | Nagao | B23K 20/1265 228/102 |
| 2005/0001010 | A1* | 1/2005 | Koga | B23K 37/0443 228/2.1 |
| 2005/0029331 | A1* | 2/2005 | Kano | B23K 20/123 228/112.1 |
| 2006/0086707 | A1* | 4/2006 | Kou | B23K 20/1235 219/137 R |
| 2008/0083817 | A1* | 4/2008 | Baumann | B23K 20/123 228/102 |
| 2008/0135601 | A1* | 6/2008 | Chen | B23K 20/1235 228/102 |
| 2011/0099808 | A1* | 5/2011 | Imamura | B23K 20/123 29/882 |
| 2012/0012643 | A1* | 1/2012 | Beech | B23K 20/121 228/102 |
| 2014/0069986 | A1* | 3/2014 | Okada | B23K 20/123 228/112.1 |
| 2015/0041521 | A1* | 2/2015 | Matsushita | B23K 20/227 228/112.1 |
| 2015/0143686 | A1* | 5/2015 | Blacket | B21J 15/26 29/525.06 |
| 2016/0074957 | A1* | 3/2016 | Nishida | B23K 37/0282 228/114.5 |
| 2016/0263697 | A1* | 9/2016 | Matsushita | C22C 38/50 |
| 2017/0216960 | A1* | 8/2017 | Sayama | B23K 20/1245 |
| 2017/0304935 | A1* | 10/2017 | Okada | B23K 20/24 |
| 2018/0297145 | A1* | 10/2018 | Ohashi | B23K 20/127 |
| 2019/0193167 | A1* | 6/2019 | Horiuchi | B25J 11/005 |
| 2019/0262934 | A1* | 8/2019 | Ohashi | B23K 20/1265 |

\* cited by examiner

FRICTION SPOT JOINING DEVICE AND FRICTION SPOT JOINING METHOD

TECHNICAL FIELD

The present disclosure relates to a friction spot joining device and a friction spot joining method.

BACKGROUND ART

Conventionally, a friction spot joining method is known as a method of mutually joining a pair of plates. When joining the pair of plates by this method, a tool of a friction spot joining device is pushed into the pair of plates which are overlapped with each other while the tool is rotated, and is drawn out after the completion of joining, for example, as disclosed in Patent Document 1. Thus, the pair of plates are friction-spot joined.

REFERENCE DOCUMENT OF CONVENTIONAL ART

Patent Document

[Patent Document 1] JP3,471,338B2

DESCRIPTION OF THE DISCLOSURE

Problems to be Solved by the Disclosure

Meanwhile, when carrying out the friction spot joining of the pair of plates, if the surface condition of the tool changes with an increase in the number of joining points or the frictional coefficient between the tool and the plates changes due to different surface conditions of the plates at respective joining positions, a pushing period of time of the tool to the plates and a stirring state of the plates by the tool may change to cause a variation in the joining quality, or the tool may be overheated to cause an excessive worn-out and a shortened life of the tool.

Therefore, one purpose of the present disclosure is, when carrying out the friction spot joining of a pair of plates, to stabilize a joining quality and extend the life of a tool, while reducing an operator's burden to adjust a joining device, by controlling a variation in the joining quality and an overheat of the tool even if states of the tool and/or the plates change.

SUMMARY OF THE DISCLOSURE

In order to solve the above problem, according to one aspect of the present disclosure, a friction spot joining device configured to carry out friction spot joining of a pair of plates is provided, which includes an advance-retreat drive configured to advance and retreat a tool to/from the plates, a rotation drive configured to rotate the tool, and a controller configured to control the advance-retreat drive and the rotation drive. The controller executes a joining control in which the tool is caused to give pressure to the plates while the tool is rotated so that the tool is pushed into the plates, and a separating control in which the tool is separated from the plates when an integrated value calculated using a current value of the rotation drive during the joining control and a driving period of time during the joining control is determined to be reached a target value.

According to this configuration, since the tool is separated from the plates when the integrated value calculated using the current value and the driving time period is determined to be reached the target value, the inputted quantity of heat supplied to the plates from the tool is uniformized during a period after the tool begins pressing the plates and pushing into the plates at each joining position until the tool is separated from the plates, a variation of the degree of friction stirring of the plates carried out by the tool is reduced. Thus, even if the states of the tool or the plates change when carrying out the friction spot joining of the plates, it can prevent that the pushing period of time of the tool into the plates and/or the stirring state of the plates by the tool change to cause the variation in a joining quality, or the tool is excessively worn out by an overheating of the tool to shorten the life of the tool. Therefore, the joining quality can be stabilized and the life of the tool can be extended, while reducing the burden of an operator to adjust the joining device in order to reduce such a variation in the joining quality and/or the overheat of the tool.

The controller may calculate the integrated value using a product of the current value, the driving period of time, and a rotational speed of the tool during the joining control. Thus, for example, when the rotational speed of the tool during the joining control is increased, the driving period of time is shortened to uniformize the inputted quantity of heat supplied to the plates from the tool at each joining position, and the overheat of the tool is reduced.

The controller may change the target value according to temperature of the tool pushed into the plates during the joining control. Thus, even if the temperature of the tool pushed into the plates at each joining position differs, by changing the target value accordingly, the temperature of the tool during and after the joining can further be stabilized.

According to another aspect of the present disclosure, a method of carrying out friction spot joining of a pair of plates is provided, which includes a joining process for causing a tool to give pressure to the plates while the tool is rotated by a rotation drive so that the tool is pushed into the plates, an integrated value calculating process for calculating an integrated value using a current value of the rotation drive in the joining process and a driving period of time of the rotation drive in the joining process, and a separating process for separating the tool from the plates when the integrated value is determined to be reached a target value.

Effect of the Disclosure

According to the present disclosure, when carrying out the friction spot joining of the pair of plates, even if the states of the tool and/or the plates change, the joining quality is stabilized and the life of the tool is extended while reducing the operator's burden to adjust the joining device, by controlling the variation in the joining quality and the overheat of the tool.

MODE FOR CARRYING OUT THE DISCLOSURE

Embodiment

Hereinafter, one embodiment is described with reference to the drawings.

Figure 1:
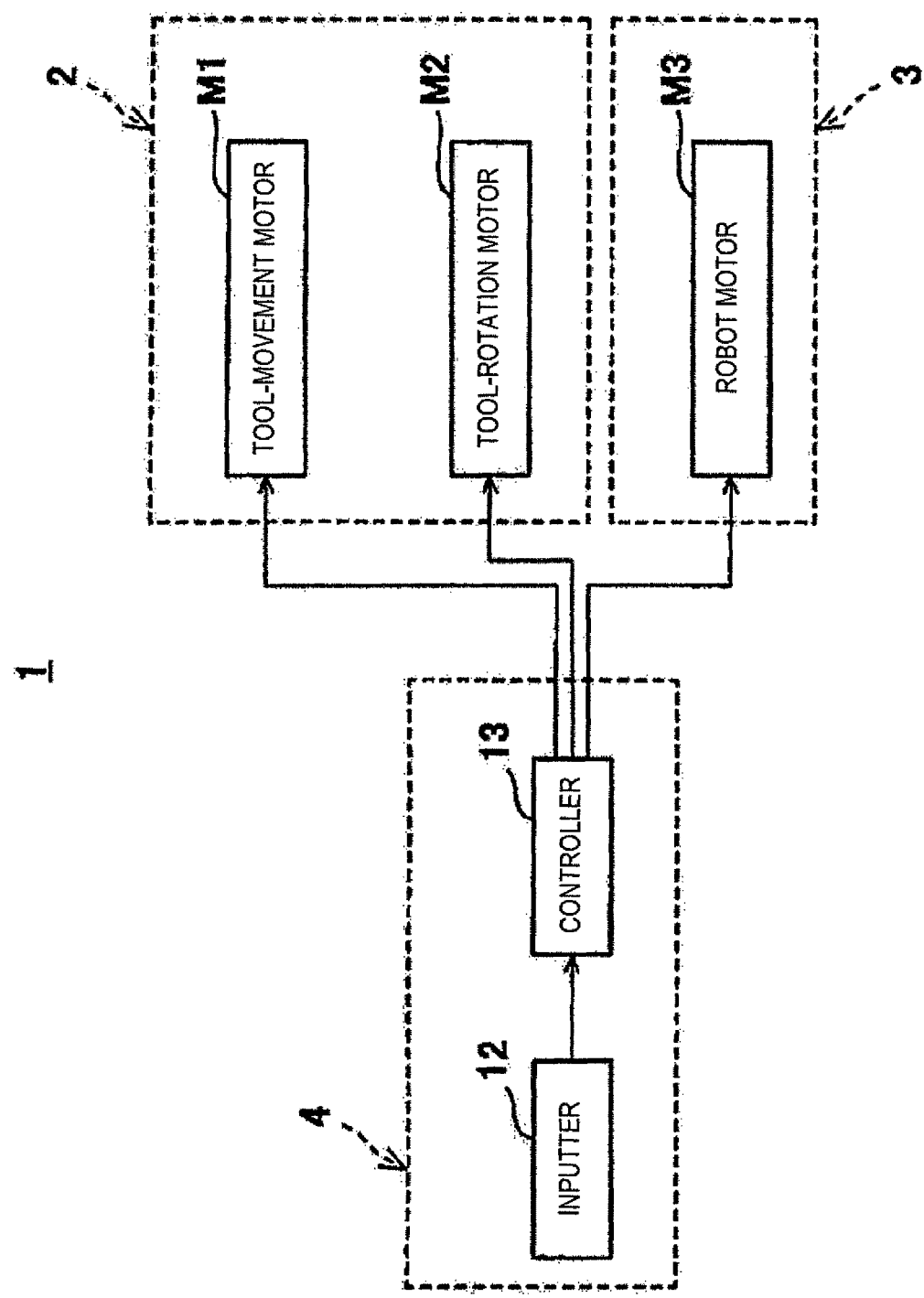
FIG. 1 is a functional block diagram of a friction spot joining device according to one embodiment.
Figure 2:
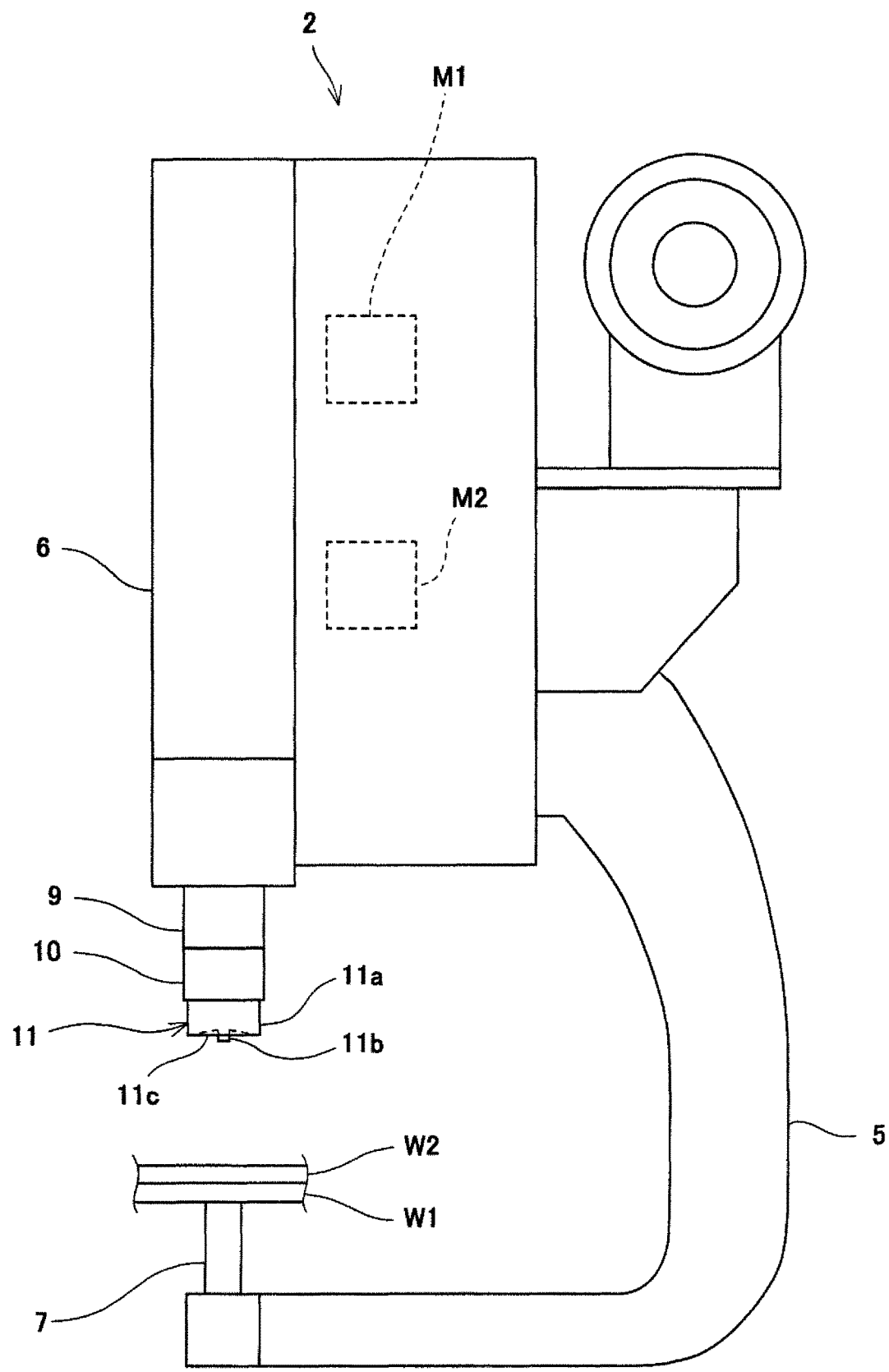
FIG. 2 is a side view of a joining unit provided to the friction spot joining device of FIG. 1.

FIG. 1 is a functional block diagram of a friction spot joining device 1 (hereinafter, referred to as "the joining device 1") according to one embodiment. FIG. 2 is a side view of a joining unit 2 provided to the joining device 1 of FIG. 1. As illustrated in FIGS. 1 and 2, the joining device 1 includes the joining unit 2, an articulated robot 3, and a control device 4. The joining unit 2 has a frame part 5, a unit main body part 6, and a backing part 7.

The frame part 5 has an appeared shape of a "C" character or an inverted "C" character in the side view as one example. The frame part 5 is connected with the unit main body part 6 and the backing part 7, and is supported by the articulated robot 3. The unit main body part 6 has a rotary shaft part 9, a tool 11, a tool-movement motor M1 (advance-retreat drive), and a tool-rotation motor M2 (rotation drive). The rotary shaft part 9 extends toward the backing part 7 from a casing of the unit main body part 6, and is provided so as to be approachable to and separatable from the backing part 7. A holder is provided at one end of the rotary shaft part 9 in axial directions, which is located away from the casing of the unit main body part 6, and it holds the tool 11 so as to be attachable and detachable.

The tool 11 has a tool main body part 11a, a pin part 11b, and a shoulder part 11c, and is provided so as to be contactable to or separatable from a surface of a plate W2 opposite from a plate W1. The pin part 11b protrudes toward the backing part 7 from the tool main body part 11a, and is surrounded by the shoulder part 11c. Although the circumferential surface of the pin part 11b is flat as one example, it may be threaded.

The motors M1 and M2 are built in the casing of the unit main body part 6. When the tool-movement motor M1 is driven, the rotary shaft part 9 and the tool 11 advance and retreat toward the plates W1 and W2 in the axial directions of the rotary shaft part 9. Moreover, when the tool-rotation motor M2 is driven, the rotary shaft part 9 and the tool 11 rotate on the axis of the rotary shaft part 9. Each drive of each of the motors M1 and M2 is controlled by the control device 4.

The backing part 7 is arranged so as to oppose to the tool 11, while having the plates W1 and W2 therebetween, has a cylindrical appeared shape extending toward the unit main body part 6 from the frame part 5 as one example, and supports the plate W1 from below. A tip end part of one end of the backing part 7 in the axial directions, which is located away from the frame part 5, contacts a surface of the plate W1 opposite from the plate W2.

The articulated robot 3 has a robot motor M3, and moves the joining unit 2 to a given position. Drive of the robot motor M3 is controlled by the control device 4. The robot motor M3 may include a plurality of motors.

The control device 4 is a computer provided with a CPU, a ROM, a RAM, etc., and controls each operation of the joining unit 2 and the articulated robot 3. The control device 4 has an inputter 12 and a controller 13. The inputter 12 receives information which an operator inputs. The ROM stores a given control program. The RAM is configured to be storable of setting information inputted through the inputter 12. The setting information includes, for example, information on each plate thickness value of the plates W1 and W2, and information on each joining position of the plates W1 and W2.

The controller 13 controls each of the motors M1-M3 based on the control program. Moreover, based on the control program, the controller 13 calculates an integrated value P as will be described later, and performs a determination of whether the integrated value P reaches a target value $P_{Target}$, etc.

Figure 3:
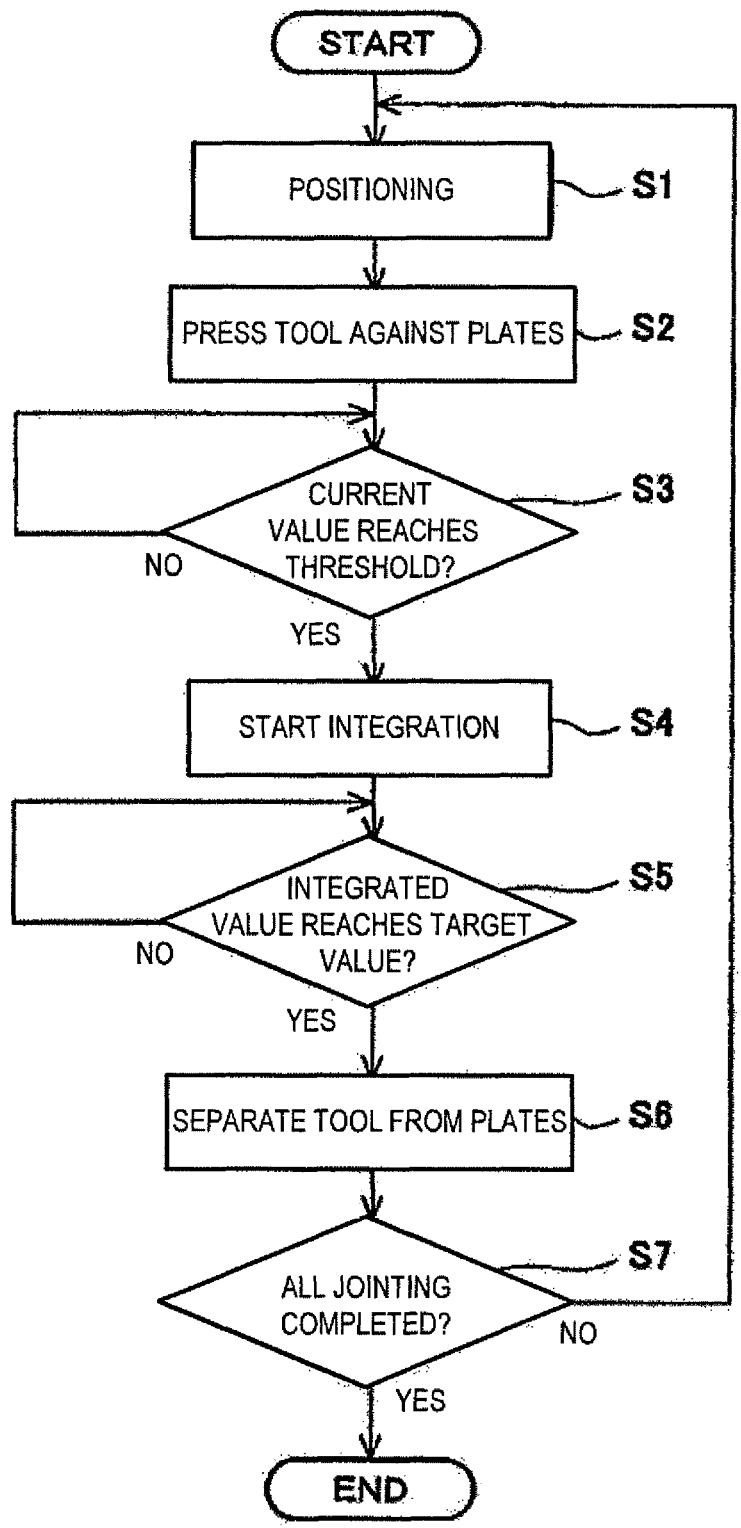
FIG. 3 is an operational flowchart of the friction spot joining device of FIG. 1.

Next, a method of successively carrying out the friction spot joining of the plates W1 and W2 made of steel at a plurality of joining positions by using the joining device 1 is illustrated. FIG. 3 is an operational flowchart of the joining device 1 of FIG. 1. As illustrated in FIG. 3, a process for positioning the joining device 1 and the plates W1 and W2 (Step S1), a process for pressing the tool 11 against the plates W1 and W2 (Step S2), a process for the controller 13 determining whether a current value reaches a threshold $I_0$ (Step S3), a process for the controller 13 starting a calculation of the integrated value P during a joining control (Step S4), a process for the controller 13 determining whether the integrated value P during the joining control reaches the target value $P_{Target}$ (Step S5), a process for separating the tool 11 from the plates W1 and W2 (Step S6), and a process for the controller 13 determining whether the spot joining is completed at all the joining positions (Step S7), are performed in this order, and if there is any remaining position to be joined in the plates W1 and W2, Step S1 is performed again.

Figure 4:
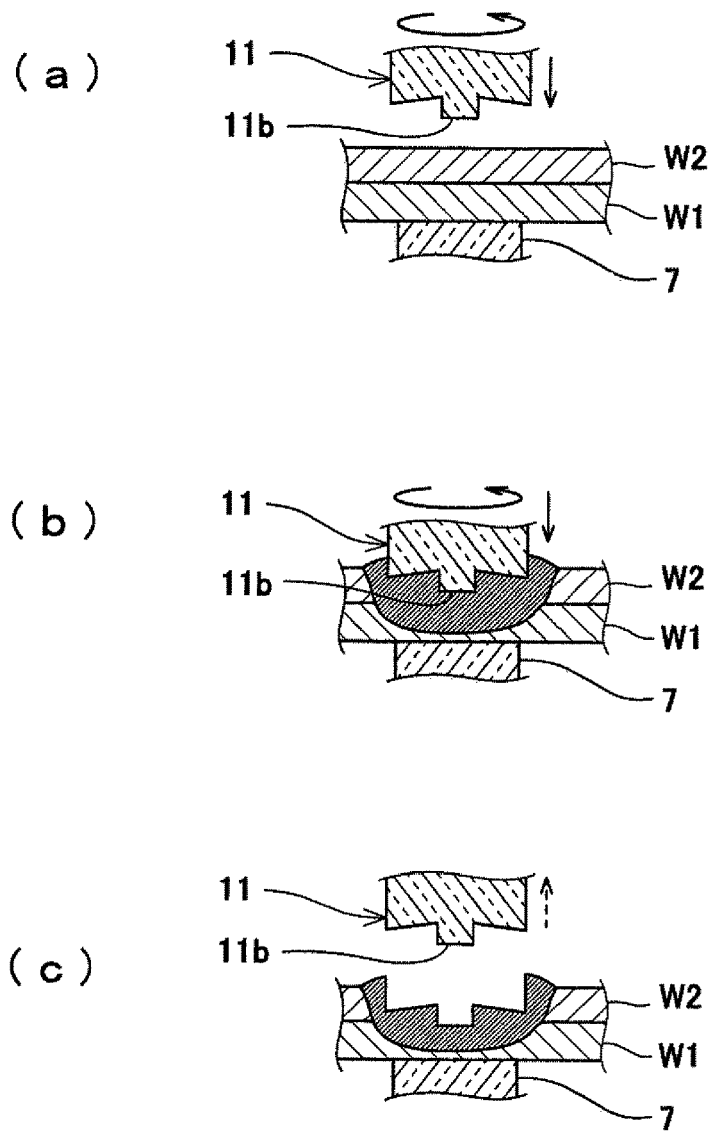
FIGS. 4(a) to (c) are cross-sectional views illustrating each process of friction spot joining by using the friction spot joining device of FIG. 1.
Figure 5:
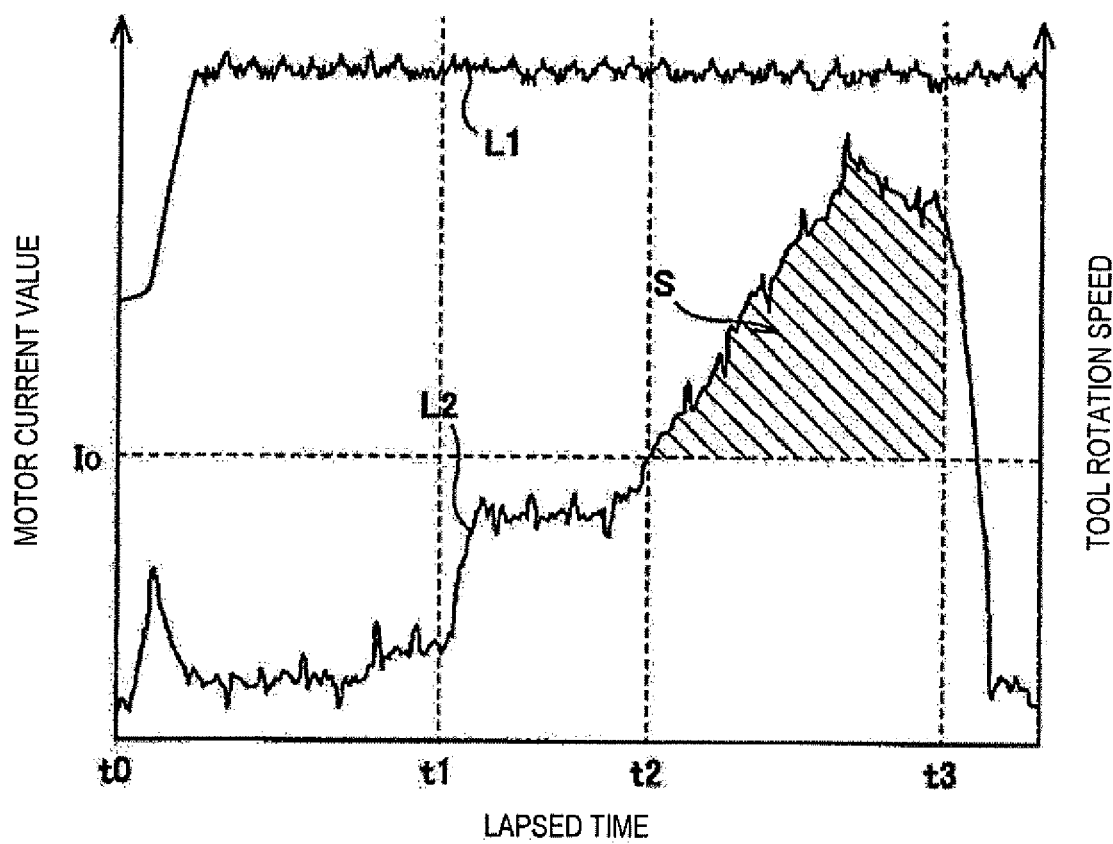
FIG. 5 is a view illustrating time changes of a rotational speed of a tool and a current value of a tool-rotation motor.

FIGS. 4(a) to (c) are cross-sectional views illustrating each process of the friction spot joining by using the joining device 1 of FIG. 1. FIG. 5 is a view illustrating time changes in the rotational speed of the tool 11 and the current value of the tool-rotation motor M2. In FIG. 5, the time change of the rotational speed of the tool 11 is illustrated by a curve L1, and the time change of the current value of the tool-rotation motor M2 is illustrated by a curve L2. As illustrated by the curve L1, the rotational speed of the tool 11 from the contact of the tool 11 with the plate W2 (time t1) to the completion of the joining control (time t3) is initially set so as to be a substantially constant value, but it is not limited to this setting. Moreover, the material of the plates W1 and W2 may be material other than steel (e.g., aluminum etc.). Moreover, the number of plates to be joined may not be limited to only two plates, but may be three or more plates.

First, the operator inputs the setting information into the joining device 1 through the inputter 12 so that a given jig holds the plates W1 and W2 in an overlapped manner. Then, as illustrated in FIG. 4(a), the controller 13 moves the joining unit 2 to a position corresponding to one joining position, and causes the tip end part of the backing part 7 to support the plate W1 so that the tool 11 is arranged at the plate W2 side and the backing part 7 is arranged at the plate W1 side (Step S1).

Next, as illustrated in FIG. 4(b), by controlling the respective motors M1 and M2, the controller 13 causes the tool 11 to give pressure to the plates W1 and W2 while the tool 11 is rotated so that the joining control in which the tool 11 is pushed into the plates W1 and W2 to carry out the friction stirring is executed. As illustrated in FIG. 5, here, the controller 13 controls the tool-rotation motor M2 to start the rotation of the tool 11 at the time t0. Moreover, the controller 13 controls the respective motors M1 and M2 to start the joining control by contacting the tool 11 under rotation with the plate W2 and causing the tip end part of the pin part 11$b$ to give pressure to the plates W1 and W2 at the time t1 (Step S2). At the time t2, the pin part 11$b$ is pushed into the plates W1 and W2, and the tool 11 gives pressure to the plates W1 and W2 while being rotated, frictional heat is generated between the tool 11 and the plates W1 and W2 so that the heat is inputted into the plates W1 and W2 from the tool 11. Thus, the joining process in which the tool 11 is pushed into the plates W1 and W2 is carried out by the tool-rotation motor M2 causing the tool 11 to rotate and the tool 11 giving pressure to the plates W1 and W2, to perform the friction spot joining of the plates W1 and W2.

The controller 13 determines whether current value required for rotating a rotary shaft of the tool-rotation motor M2 (hereinafter, simply referred to as "the current value of the tool-rotation motor M2") reaches a threshold $I_0$ (Step S3). Here, the threshold $I_0$ is set beforehand to correspond to a current value of the tool-rotation motor M2 when the pin part 11$b$ is pushed into the plates W1 and W2 (time t2). At Step S3, if the controller 13 determines that the current value of the tool-rotation motor M2 reaches the threshold $I_0$, it starts a calculation of the integrated value P using the current value of the tool-rotation motor M2 during the joining control and a driving period of time of the tool-rotation motor M2 during the joining control (Step S4). Thus, the integrated value calculating process for the controller 13 calculating the integrated value P during the joining control is performed.

As one example, the integrated value P is calculated using a product of the current value of the tool-rotation motor M2 during the joining control, the driving period of time of the tool-rotation motor M2 during the joining control, and the rotational speed of the tool 11 during the joining control. Here, the integrated value P is calculated as a value of the product of a current value difference $I_D$ obtained by subtracting a constant value $I_N$ from the current value $I_M$ of the tool-rotation motor M2 after the current value reaches the threshold $I_0$ ($I_M - I_N = I_D$), the driving period of time $\Delta T$ of the tool-rotation motor M2 after the current value I reaches the threshold $I_0$, and the rotational speed N of the tool 11 after the current value I reaches the threshold $I_0$ ($I_D \times \Delta T \times N = P$). Here, the constant value $I_N$ is set to the threshold $I_0$.

As illustrated in FIG. 5, in this case, in the graph representing a relation between the current value of the tool-rotation motor M2 and a lapsed time of the joining control (driving period of time), the product of the current value difference $I_D$ and the driving period of time $\Delta T$ is expressed by an area S defined by a curve L2 within a range where the current value of the tool-rotation motor M2 exceeds the threshold $I_0$, and the integrated value P is expressed by a value of a product of the area S and the rotational speed N ($S \times N = P$). Note that, the constant value $I_N$ may be other than the threshold $I_0$, or may be 0. The integrated value P increases with the quantity of heat supplied from the tool 11 and inputted into the plates W1 and W2 during the joining control.

Moreover, an encoder which detects a rotational speed of the tool-movement motor M1 may be provided to the joining device 1, and the controller 13 may acquire positional information on the tool 11 by the rotational speed of the tool-movement motor M1. In this case, at Step S3, the controller 13 determines whether the encoder detects the positional information on the tool 11 when the tool 11 begins to be pushed into the plate W2 during the joining control. If it determines that the positional information is detected, the integration of the integrated value P may be started at Step S4.

Moreover, Step S3 may be omitted, and the controller 13 may calculate the integrated value P as a value of a product of the current value of the tool-rotation motor M2 after the contact of the tool 11 with the plate W2, the driving period of time of the tool-rotation motor M2 after the contact, and the rotational speed of the tool 11 after the contact. In this case, for example, a load detector which detects a pressing force of the tool 11 may be provided to the backing part 7, etc., and the controller 13 may be capable of detecting a timing of the tool 11 contacting the plate W2 by inputting an output signal of the load detector into the controller 13.

The controller 13 determines whether the integrated value P during the joining control reaches the target value $P_{Target}$ (Step S5). At Step S5, if the controller 13 determines that the integrated value P reaches the target value $P_{Target}$ (see the time t3), it ends the joining control, and as illustrated in FIG. 4($c$), it controls the motor M1 to perform a separation control in which the tool 11 is separated from the plates W1 and W2 (Step S6). Thus, the separating process is performed.

The target value $P_{Target}$ may be set suitably. The threshold $I_0$ of the current of the tool-rotation motor M2 during the joining control, the rotational speed of the tool 11 during the joining control, and the pressing force of the tool 11 during the joining control are set according to the material of the surface of the tool 11, various characteristics of the surface and the inside of the tool 11 (a frictional coefficient, a heat conductivity, etc.), the dimension and the shape of the tool 11, the materials and the dimensions of the plates W1 and W2, etc. Therefore, for example, by a prior experiment, the target value $P_{Target}$ is desirable to be set by carrying out initial settings of the threshold $I_0$ of the current of the tool-rotation motor M2 with which the plates W1 and W2 are suitably spot joined by the tool 11, the rotational speed of the tool 11, and the pressing force of the tool 11.

Note that the final destination position of the tool 11 with respect to the plates W1 and W2 in each plate thickness direction of the plates W1 and W2 may be initial set, and the target value $P_{Target}$ may be set using the load detector by calculating a value of a product of the current value of the tool-rotation motor M2, the driving period of time of the tool-rotation motor M2, and the rotational speed of the tool 11 after the tool 11 contacts the plate W2 until it reaches the final destination position.

Moreover, for example, an external control device communicatably connected with the control device 4 wiredly or wirelessly may integrate the integrated value P. Moreover, at Step S5, for example, the external control device may determine whether the integrated value P during the joining control reaches the target value $P_{Target}$. In this case, at Step S5, if the external control device determines that the integrated value P during the joining control reaches the target value $P_{Target}$, it causes the controller 13 to execute the separation control.

When the separation control is completed at one of the joining positions, the controller 13 determines whether the spot joining of the plates W1 and W2 is completed at all the joining positions (Step S7). At Step S7, if the controller 13 determines that the spot joining has not been completed at all the joining positions of the plates W1 and W2, Step S1 is again performed by the controller 13 controlling the robot motor M3 so that the tool 11 moves to the next joining position. At Step S7, if the controller 13 determines that the spot joining at all the joining positions of the plates W1 and W2 is completed, the operational flow illustrated in FIG. 3 is ended.

As described above, since in the joining device 1 the tool 11 is separated from the plates W1 and W2 when the integrated value P during the joining control is determined to be reached the target value $P_{Target}$, the inputted quantity of heat supplied to the plates W1 and W2 from the tool 11 is uniformized during a period after the tool 11 begins pressing the plates W1 and W2 or the tool 11 begins pushing into the plates W1 and W2 at each joining position until the tool 11 is separated from the plates W1 and W2, a variation of the degree of friction stirring of the plates W1 and W2 carried out by the tool 11 is reduced. Thus, when carrying out the friction spot joining of the plates W1 and W2, it can prevent that, due to the change in the surface condition of the tool 11 and/or change in the frictional coefficient between the tool 11 and the plates W1 and W2, the pushing period of time of the tool 11 into the plates W1 and W2 and/or the stirring state of the plates W1 and W2 by the tool 11 change to cause the variation in joining quality (e.g., an appearance quality of the joining part of the plates W1 and W2, a plate thickness at a portion which remains inside a pin hole formed at each joining position of the plates W1 and W2 (hereinafter, referred to as "the remaining plate thickness"), joining strength, etc.), or the tool 11 is excessively worn out by the overheating of the tool 11 to shorten the life of the tool 11. Therefore, the joining quality can be stabilized and the life of the tool 11 can be extended, while reducing the burden of the operator to adjust the joining device 1 in order to prevent the variation in the joining quality and/or the shortening of the life of the tool 11.

Moreover, since the variation in the degree of the friction stirring the plates W1 and W2 carried out by the tool 11 is reduced, for example, even when carrying out the friction stirring joining of the plates W1 and W2 successively at the plurality of joining positions, it can prevent that the tool 11 which is heated to high temperature and became easy to be pushed into the plates W1 and W2 are excessively pushed into the plates W1 and W2 at the next joining position, the joining quality can be stabilized by reducing the variation in the joining quality, and the life of the tool 11 can be extended by preventing the worn-out of the tool 11 due to the overheat.

Here, if the period of time for the tool 11 to carry out the friction stirring and joining of the plates W1 and W2 is initially set to a constant value beforehand and the joining process is ended when the controller simply determines that the period of time is passed, the joining process may be ended even if suitable friction stirring and joining has not been performed by the tool 11. Moreover, if the final destination position of the pin part 11b pushed into the plates W1 and W2 is initially set to a constant value with respect to the plates W1 and W2 beforehand and the joining process is ended when the controller simply determines that the pin part 11b reaches the final destination position, the joining process may be ended, for example, even if the suitable friction stirring and joining have not been performed due to the worn-out and damage of the pin part 11b.

On the other hand, in the joining device 1, at each joining position, the threshold $I_0$ of the current value of the motor M2 is set beforehand corresponding to the current value when the pin part 11b is pushed into the plates W1 and W2, and the controller 13 determines whether the integrated value P during the joining control reaches the target value $P_{Target}$. Thus, it can be confirmed whether the plates W1 and W2 are suitably friction stirred by the tool 11 with torque of the tool-rotation motor M2 above a specified value, and the joining quality can be managed while joining the plates W1 and W2.

Moreover, by calculating the integrated value P using a product with the rotational speed N of the current value of the tool-rotation motor M2 during the joining control, the driving period of time of the tool-rotation motor M2 during the joining control, and the tool 11 during the joining control. For example, when the rotational speed N of the tool 11 in the joining control is increased, since the driving period of time of the tool-rotation motor M2 during the joining control is shortened to uniformize the inputted quantity of heat supplied to the plates W1 and W2 from the tool 11 at each joining position, the overheat of the tool 11 can be reduced.

Note that, for example, the encoder may be provided to the joining device 1, and at each joining position, the controller 13 may further control the tool-movement motor M1 so that the rotational speed of the tool-movement motor M1 when the tool 11 is pressed against the plates W1 and W2 and the tool 11 is pushed into the plates W1 and W2 becomes constant during the joining control. Thus, the remaining plate thickness at each joining position of the plates W1 and W2 can further be uniformized to improve the joining quality of the plates W1 and W2.

Below, modifications will be described focusing on differences from the embodiment.

Modifications

Figure 6:
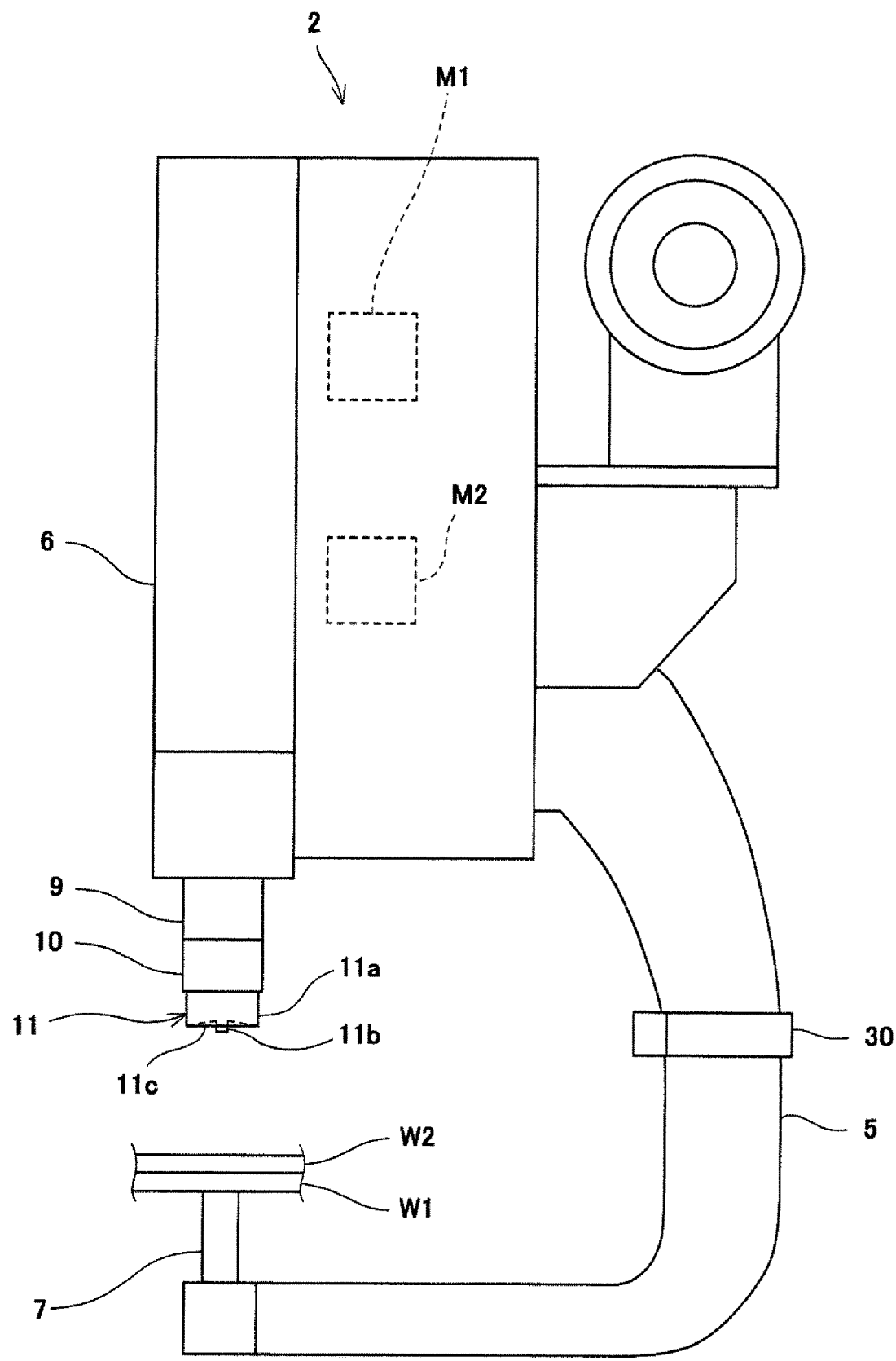
FIG. 6 is a side view of a joining unit provided to a friction spot joining device of a modification.

FIG. 6 is a side view of a joining unit 2 provided to a joining device 1 of one modification. The joining device 1 of this modification is provided with a thermometer 30 which is capable of measuring temperature of the tool 11 (here, a surface temperature near the tip end part of the pin part 11b). The thermometer 30 is a radiation thermometer as one example, and is fixed to the frame part 5 of the joining unit 2. Measurements of the thermometer 30 are monitored by the controller 13.

In the joining device 1 of this modification, the controller 13 changes the target value $P_{Target}$ according to the temperature of the tool 11 pushed into the plates W1 and W2 during the joining control. Concretely, the controller 13 changes the target value $P_{Target}$ according to the surface temperature of the pin part 11b which is measured by the thermometer 30 immediately before pushing the tool 11 into the plates W1 and W2 during the joining control at each joining position. Concretely, immediately before pushing the tool 11 into the plates W1 and W2 during the joining control at each joining position, if the surface temperature of the pin part 11b measured by the thermometer 30 is higher than a threshold $T_1$, the controller 13 sets the target value $P_{Target}$ to a smaller value than the original setting (e.g., a value within a range of 70% to 90% of the original setting), and if it is lower than a threshold $T_2$, the controller 13 sets the target value $P_{Target}$ to a larger value than the original setting (e.g., a value within a range of 110% to 130% of the original setting). The thresholds $T_1$ and $T_2$ can be set suitably. By a prior experiment, the threshold $T_1$ can be set to, for example, the surface temperature of the pin part 11b when the remaining plate thickness of the plates W1 and W2 becomes below a given first plate thickness value, and the threshold $T_2$ can be set to, for example, the surface temperature of the pin part 11b when the remaining plate thickness of the plates W1 and W2 exceeds a given second plate thickness value.

Thus, by changing the target value $P_{Target}$ according to the temperature of the tool 11 immediately before pushing it into the plates W1 and W2 during the joining control, the temperature of the tool 11 during and after the joining can further be stabilized even if the temperature of the tool 11 immediately before pushing the tool 11 into the plates W1 and W2 at each joining position differs.

In a joining device 1 of another modification, the integrated value P is calculated as a value of a product of the current value of the tool-rotation motor M2 during the joining control and the driving period of time of the tool-rotation motor M2 during the joining control. As one example, the integrated value P is calculated as a value of a product of the current value difference $I_D$ and the driving period of time $\Delta T$ ($I_D \times \Delta T = P$). In this modification, the integrated value P can be expressed by the area S of FIG. 5.

By calculating the integrated value P as described above, the calculation method of the integrated value P can be simplified and the calculating load of the controller 13 can be reduced. Especially, the joining device 1 of this modification can favorably be used, for example, in a case where the rotational speed N of the tool 11 is comparatively difficult to affect to the change in the inputted quantity of heat supplied to the plates W1 and W2 from the tool 11, such as when the rotational speed N during the joining control is set to a constant value.

(Verification Test)

Using a joining device of each of an example and a comparative example, each change in the temperature of the tool 11, the diameter of the pin part 11b, the joining strength of the plates W1 and W2, the remaining plate thickness of the plates W1 and W2 when successively carrying out the friction spot joining of the plates W1 and W2 at the plurality of joining positions, was examined.

In the joining device of the example, the threshold $I_0$ of the current of the tool-rotation motor M2, the rotational speed of the tool 11, and the pressing force of the tool 11 were initially set so that the spot joining of the plates W1 and W2 is suitably carried out by the tool 11 of which the pin part 11b is formed with the covering part. The integrated value P and the target value $P_{Target}$ were set to a value of a product of the current value of the tool-rotation motor M2 after the threshold $I_0$ being reached and the driving period of time of the tool-rotation motor M2 after the current value reaches the threshold $I_0$. In the joining device of the comparative example, using a tool 11 similar to the example, like the example, the rotational speed of the tool 11, the pressing force of the tool 11, and a time after the pressing of the tool 11 against the plates W1 and W2 is started until the tool 11 is separated from the plates W1 and W2 (hereinafter, referred to as "the joining period of time") were initially set. The joining strength of the plates W1 and W2 were measured by a tensile shear strength test defined in the JIS Z 3140 standard. The temperature of the tool 11 was measured by the radiation thermometer.

Figure 7:
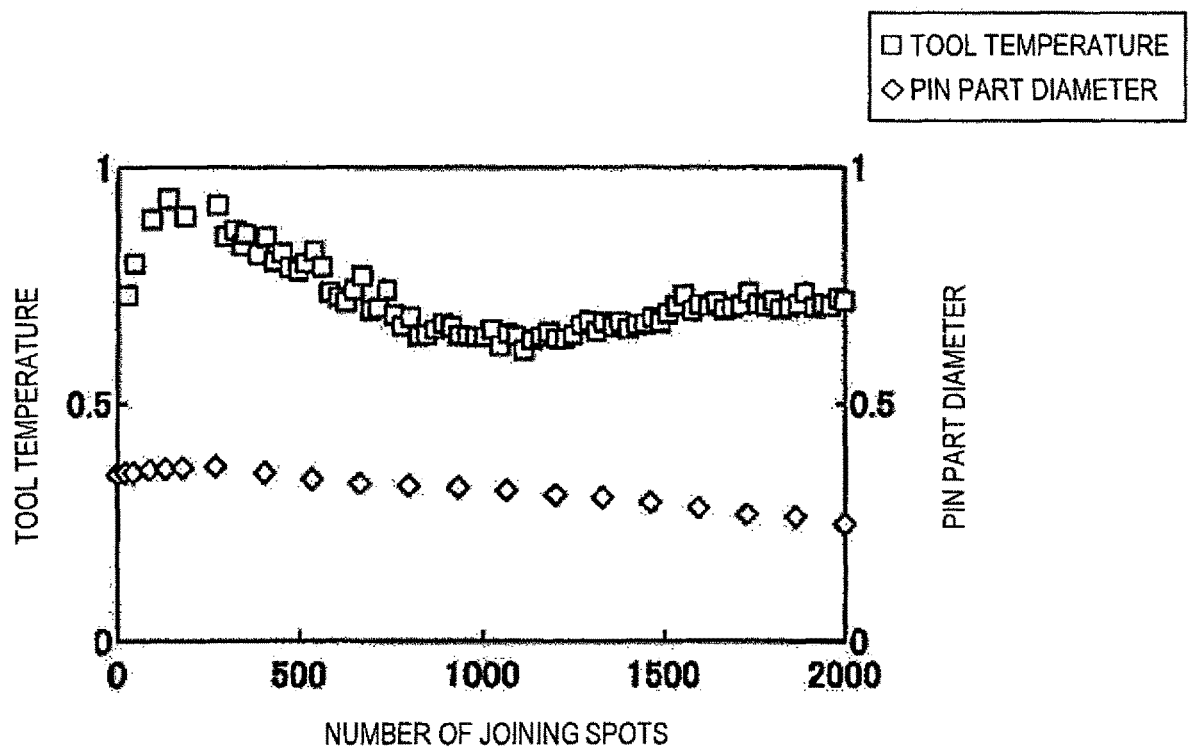
FIG. 7 is a view illustrating changes in temperature of a tool and a diameter of a pin part of a comparative example.
Figure 8:
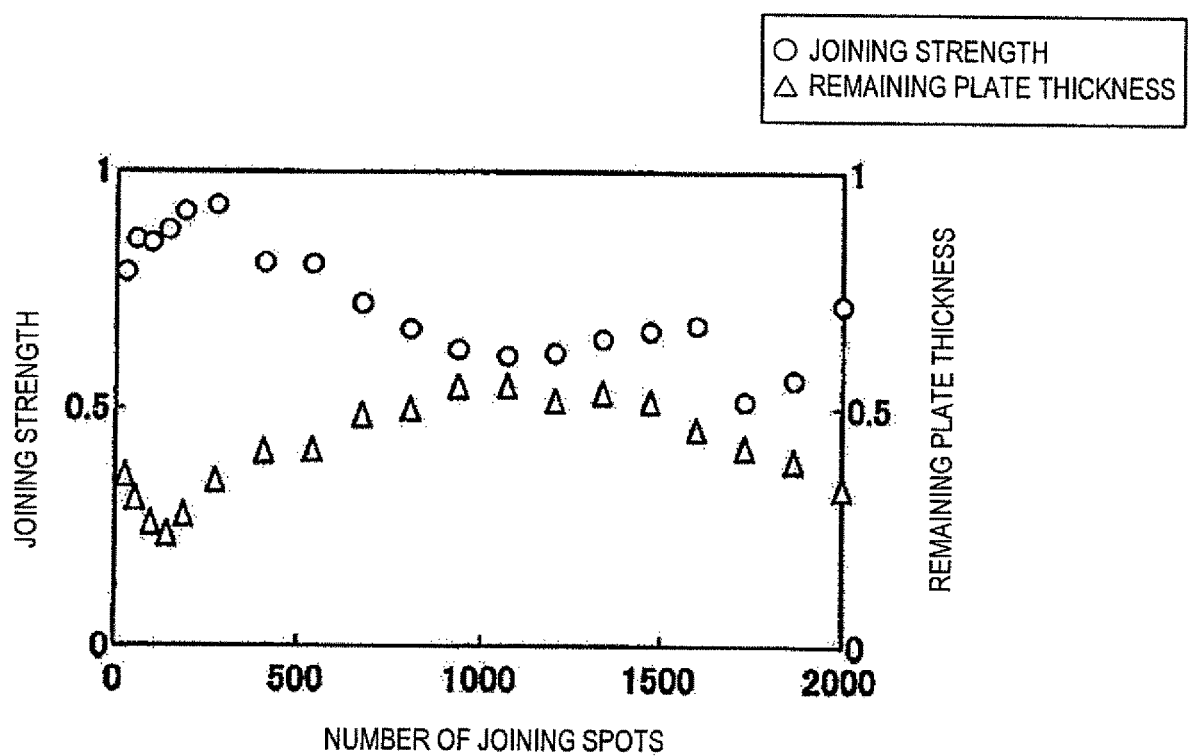
FIG. 8 is a view illustrating changes in a joining strength and a remaining plate thickness of the comparative example.

FIG. 7 is a view illustrating changes in the temperature of the tool 11 and the diameter of the pin part 11b of the comparative example. FIG. 8 is a view illustrating changes in the joining strength and the remaining plate thickness of the comparative example. In FIGS. 7 and 8, each value of the temperature of the tool 11, the diameter of the pin part 11b, the joining strength of the plates W1 and W2, and the remaining plate thickness of the plates W1 and W2 at each joining position is illustrated by a relative value.

As illustrated in FIGS. 7 and 8, it was confirmed that the temperature of the tool 11 and the joining strength of the plates W1 and W2 of the comparative example increase rapidly between the beginning of the test and around when the number of joining spots exceeds 100, then decrease, and gently increase around when the number of joining spots exceeds 1,000. Moreover, it was confirmed that the diameter of the pin part 11b of the comparative example increases between the beginning of the test and around when the number of joining spots exceeds 100, and then decreases. Moreover, it was confirmed that the remaining plate thickness of the comparative example decreases rapidly between the beginning of the test and around when the number of joining spots exceeds 100, then increases, and decreases from around when the number of joining spots exceeds 1,000.

As one of the reasons such a test result was obtained, it is considered that, in the comparative example, the friction spot joining was carried out during the same joining period of time at each joining position, regardless of the state of the tool 11 being changed. Specifically, between the beginning of the test and around when the number of joining spots exceeds 100, a thermal expansion by the overheat of the tool 11, a break-in of the tool 11, and an increase in the frictional coefficient of the tool 11 progress, and thereafter, before the number of joining spots becomes 1,000, the decrease in the frictional coefficient of the tool 11 progresses, and from around when the number of joining spots exceeds 1,000, the covering part formed in the pin part 11b exfoliates and the wear of the pin part 11b progresses, leading to the pin part 11b becoming easier to be pushed into the plates W1 and W2.

Figure 9:
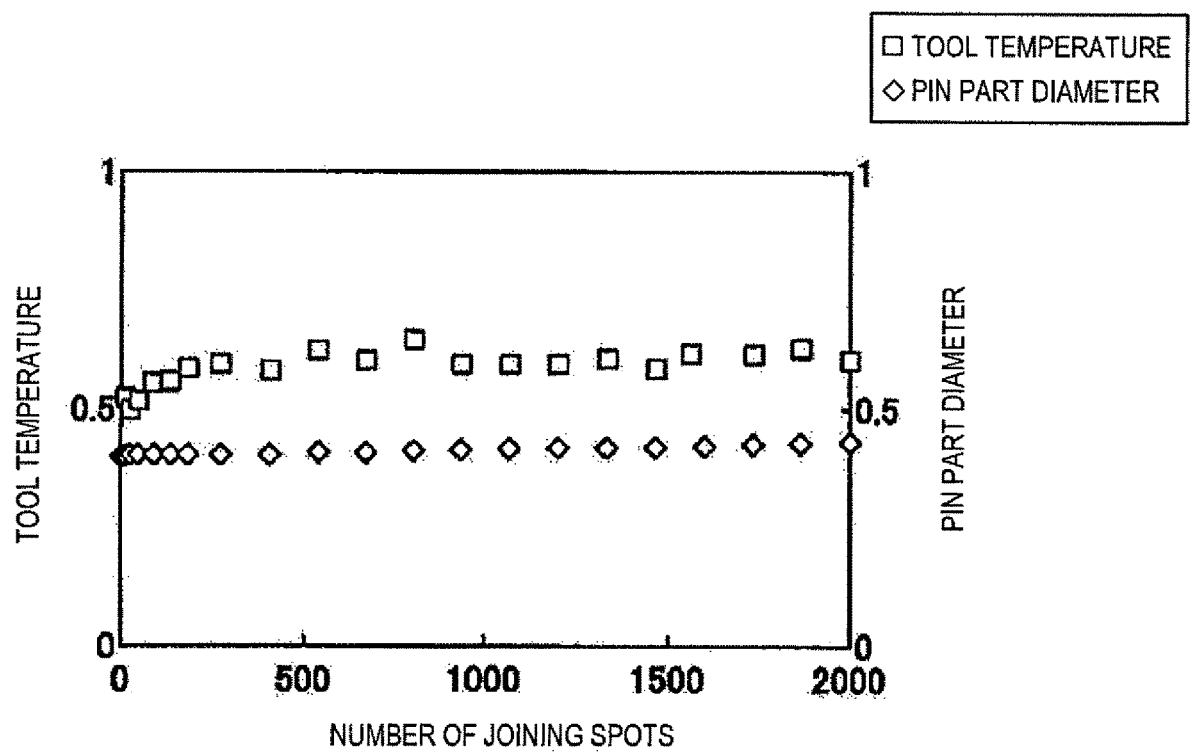
FIG. 9 is a view illustrating changes in temperature of the tool and a diameter of the pin part of one example.
Figure 10:
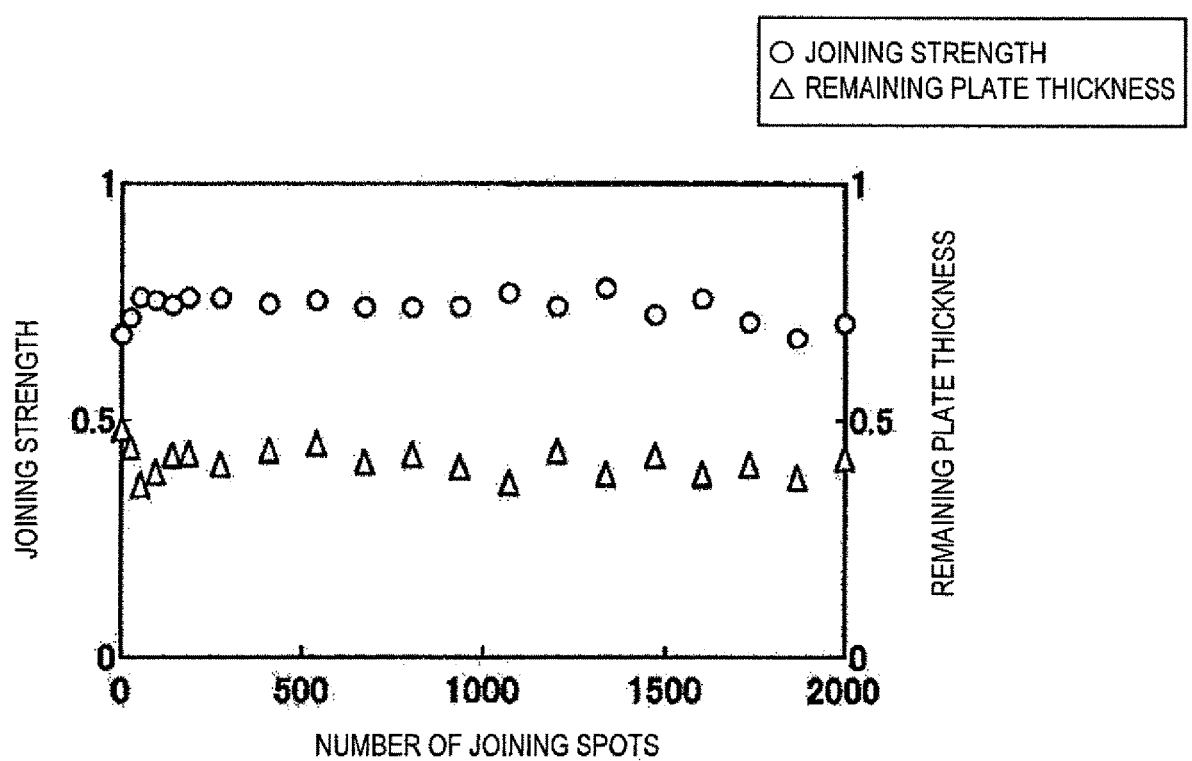
FIG. 10 is a view illustrating changes in the joining strength and a remaining plate thickness of the example.

FIG. 9 is a view illustrating changes in the temperature of the tool 11 and the diameter of the pin part 11b of the example. FIG. 10 is a view illustrating changes in the joining strength and the remaining plate thickness of the example. In FIGS. 9 and 10, similar to FIGS. 7 and 8, changes in the temperature of the tool 11, the diameter of the pin part 11b, the joining strength of the plates W1 and W2, and the remaining plate thickness of the plates W1 and W2 are illustrated. As illustrated in FIGS. 9 and 10, in this example, it is confirmed that any of the temperature of the tool 11, the diameter of the pin part 11b, the joining strength, and the remaining plate thickness is more stable than that of the comparative example within the test range.

As one of the reasons such a test result was obtained, in this example, it is considered that, even if the thermal expansion, the break-in, the increase in the wear coefficient, etc. of the tool 11 are caused to some extent after the test are started, since the inputted quantity of heat supplied to the plates W1 and W2 from the tool 11 are uniformized after the tool 11 begins to be pushed into the plates W1 and W2 at each joining position, the variation in the degree of the friction stirring of the plates W1 and W2 by the tool 11 is reduced to stabilize the joining state of the plates W1 and W2, and the temperature of the tool 11 and the remaining plate thickness of the plates W1 and W2 are uniformized.

Moreover, in this example, it is found from the test result that, when successively carrying out the friction spot joining of the plates W1 and W2 at the plurality of joining positions, the time and effort of the operator to adjust the joining device is reduced, the joining quality is stabilized, and the life of the tool 11 is extended.

DESCRIPTION OF REFERENCE CHARACTERS

P Integrated Value
$P_{Target}$ Target Value

M1 Tool-movement Motor (Advance-retreat Drive)
M2 Tool-rotation Motor (Rotation Drive)
W1, W2 Plate
1 Joining Device
11 Tool
13 Controller

What is claimed is:

1. A friction spot joining device configured to carry out friction spot joining of a pair of plates, comprising:
   an advance-retreat drive configured to advance and retreat a tool to/from the plates;
   a rotation drive configured to rotate the tool; and
   a controller configured to
      control the advance-retreat drive and the rotation drive so that the tool applies pressure to the plates while the tool is rotated so that the tool is pushed into the plates,
      determine a current value of the rotation drive while the tool is rotated,
      when the current value has exceeded a predetermined threshold that corresponds to the tool being pushed into the plates, calculate an integrated value using an amount that the current value exceeds the predetermined threshold while the tool is rotated and a driving period of time while the tool is rotated, and
      control the advance-retreat drive and the rotation drive so that the tool separates from the plates when the integrated value has reached a target value.

2. The friction spot joining device of claim 1, wherein the controller calculates the integrated value using a product of the current value, the driving period of time, and a rotational speed of the tool while the tool is pushed into the plates.

3. The friction spot joining device of claim 1, wherein the controller changes the target value according to temperature of the tool pushed into the plates while the tool is pushed into the plates.

4. A method of carrying out friction spot joining of a pair of plates, comprising:
   causing a tool to give pressure to the plates while the tool is rotated by a rotation drive so that the tool is pushed into the plates;
   determining a current value of the rotation drive while the tool is rotated;
   when the current value has exceeded a predetermined threshold that corresponds to the tool being pushed into the plates, calculating an integrated value using an amount that the current value exceeds the predetermined threshold while the tool is rotated and a driving period of time while the tool is rotated; and
   separating the tool from the plates when the integrated value has reached a target value.

* * * * *